Sept. 9, 1958      R. H. DICKE      2,851,603
MOLECULAR MICROWAVE TRANSLATING APPARATUS
Filed Feb. 29, 1956      5 Sheets-Sheet 1

INVENTOR.
ROBERT H. DICKE
BY
ATTORNEY

Sept. 9, 1958  R. H. DICKE  2,851,603
MOLECULAR MICROWAVE TRANSLATING APPARATUS
Filed Feb. 29, 1956  5 Sheets-Sheet 3
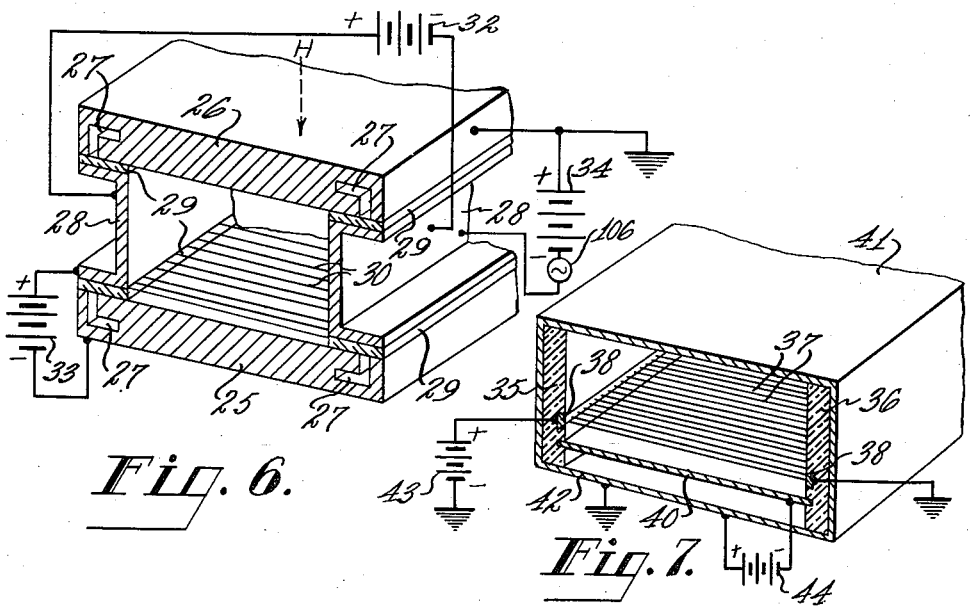
Fig. 6.
Fig. 7.
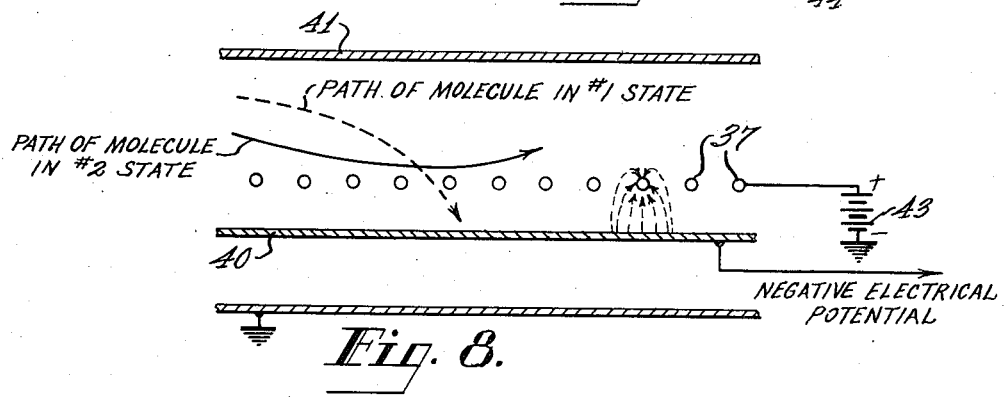
Fig. 8.
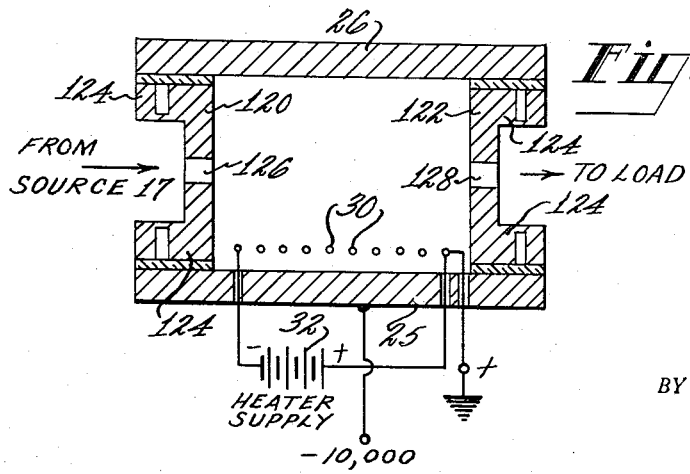
Fig. 9.
INVENTOR.
ROBERT H. DICKE
BY
ATTORNEY Sept. 9, 1958 R. H. DICKE 2,851,603
MOLECULAR MICROWAVE TRANSLATING APPARATUS
Filed Feb. 29, 1956 5 Sheets-Sheet 4

INVENTOR.
ROBERT H. DICKE
BY
ATTORNEY

United States Patent Office 2,851,603
Patented Sept. 9, 1958

2,851,603

MOLECULAR MICROWAVE TRANSLATING APPARATUS

Robert H. Dicke, Princeton, N. J.

Application February 29, 1956, Serial No. 568,559

63 Claims. (Cl. 250—36)

This invention relates broadly to molecular microwave translating devices, and it has for its object to secure and continuously maintain a microwave resonant gas in a state of non-equilibrium.

Another object of the invention is to provide a novel and improved apparatus for maintaining a molecular gas in an internal state where, of two energy levels connected by a microwave transition, there are more molecules in the higher energy state than in the lower.

Another object is to provide a molecular microwave amplifier, oscillator, spectrometer, frequency standard, mixer or the like, employing a heat engine to maintain a molecular gas in a state in which the molecules are not in thermal equilibrium, so that said gas amplifies rather than absorbs microwave energy.

Still another object is to provide an improved apparatus of the type specified which utilizes a microwave resonant gas normally presenting positive attenuation to electrical energy at frequencies for which said gas is resonant, and in which said gas is continuously maintained in a state of negative attenuation, so that it emits energy at a resonance frequency of the gas, without subjecting said gas to the action of microwave excitation power.

Various other objects and advantages will be apparent as the nature of the invention is more fully disclosed.

The present invention differs essentially from prior art microwave amplifiers, oscillators, etc., in that it provides a new method and means, specifically a heat engine, for continuously maintaining a molecular gas in a state of negative internal temperature. By a "state of negative internal temperature," is meant a state such that the two energy levels which are concerned with the microwave transition in question have populations which are abnormal in the sense that the upper energy level has a population greater than the lower energy level.

Thus, assume two energy levels of an atom or molecule having a separation $\Delta E_0 = h\nu_0$, where $h$ refers to Planck's constant and $\nu_0$ is the frequency of the microwave transition. If the lower energy level is designated 1 and the upper energy level is designated 2, then the populations (that is, the number of molecules in each of the two energy levels) may be designated $P_1$ and $P_2$, respectively. In a normal gas the ratio of the population of the upper to the lower energy state, $P_2$ divided by $P_1$ has the relation:

$$\frac{P_2}{P_1} = e^{-\frac{\Delta E_0}{kT}} \quad (1)$$

where T refers to the temperature of the gas on an absolute scale such that 0° C. is equal to 273° Kelvin. This equation can be used to define an internal temperature for the gas when the gas is not in thermal equilibrium. For example, if $P_2$ is greater than $P_1$, Equation 1 defines a temperature T which is negative, and this temperature we call the internal temperature of the gas. It is important to realize that $P_2$ can be greater than $P_1$ without the normal temperature associated with the motion of the molecules being negative. It is only the internal temperature associated with the two internal energy states which is negative in the sense defined by Equation 1.

The invention provides a method and apparatus for continuously generating and maintaining a non-equilibrium state in a molecular gas such that the upper energy level always has a population greater than the lower energy level. This generation of such an abnormal state of non-equilibrium is brought about by a combination of two effects, namely, the Stark effect and the effect of a temperature differential in the cell containing the gas. First, with regard to the Stark effect, if we plot the energy difference between the above-mentioned energy states 1 and 2 as a function of electric field strength acting on the gas, it will be observed that the curves representing the two energy states of the atom or molecule diverge as the electric field strength acting on the atom is increased, with the upper of the energy states increasing in energy while the lower decreases in energy. The device employed to utilize this effect comprises a gas cell including a grid and plate structure which produces an electric field serving as a selective reflecting member which reflects or repels molecules in the upper energy state and attracts molecules in the lower energy state. Secondly, by heating the grid and preferably also the plate of said gas cell as hereinafter described, a temperature differential is created whereby the attracted molecules (i. e., those originally in the lower energy state) are thrown nearly equally into both the upper and lower states; and these "shifted" molecules, when added to the molecules originally in the upper energy state (which are reflected back from the grid and remain in the upper state) result in a net transfer of population from the lower to the upper state with a consequent continuous preponderance in the upper state. The molecular gas maintained in such abnormal state, in which the molecules are in a condition of non-equilibrium, can emit microwave energy at the resonance frequency of the gas and thus has wide application as a microwave amplifier, oscillator, spectrometer, etc.

The invention is described more in detail in connection with the accompanying drawings, in which:

Figure 6 is a perspective view of a preferred waveguide type cell embodying the invention;

Figure 7 is a perspective view illustrating a modified waveguide cell embodying the invention;

Figure 8 is a longitudinal section through the waveguide cell of Figure 7;

Figures 9, 9a and 9b are sectional views of rectangular guide type cavity resonators embodying the invention;

Similar reference characters are applied to similar elements throughout the drawings.

Figure 1:
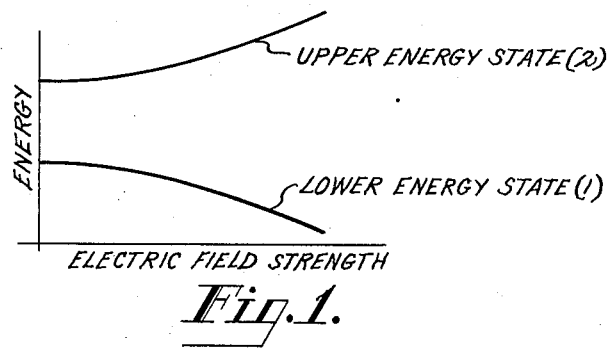
Figure 1 is a diagram illustrating the effect of an electric field on the two energy levels of the molecules of the gas employed in the cell of Figure 3.
Figure 2:
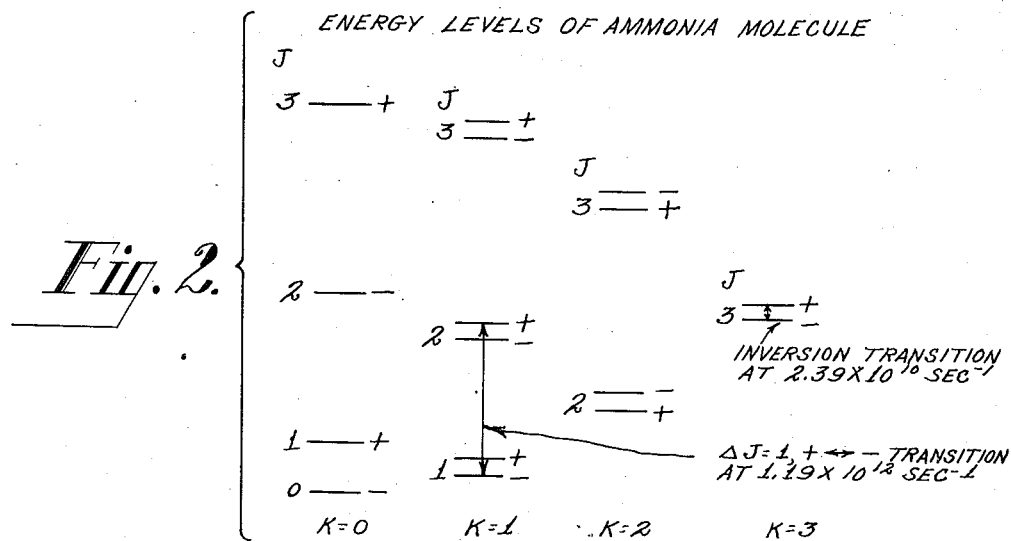
Figure 2 is a partial diagram of the energy levels of an ammonia molecule showing typical microwave transitions suitable for use in the cell of Figure 3.

In the diagram of Figure 1, the upper and lower energy states of a molecular gas are plotted as a function of the electric field strength acting on the gas. It is important to realize that the two levels considered need not be adjacent levels in the zero-field energy spectrum of the molecule. All that is essential is that the two levels be connected by a microwave transition, which may be of either the electric dipole or magnetic dipole type, and that the Stark effect on the levels be as shown in Figure 1. Examples of transitions that may be used are $$J=0 - J=1$$

rotational transitions in the methyl halides, and the $J=K=3$ inversion transition and the $$J=1, K=1, (-) - J=2, K=1, (+)$$

transition in ammonia. The latter two transitions are indicated on the partial energy level diagram for ammonia given in Figure 2.

From Figure 1 it will be noted that the upper energy level, the one designated as 2 in the previous discussion of Equation 1, increases in energy as the electric field increases, whereas the lower energy level decreases in energy. This means that the internal energy of a molecule when it is in state 2 increases with the electric field, whereas the internal energy of a molecule is actually reduced by the field if it is in state 1.

Figure 3:
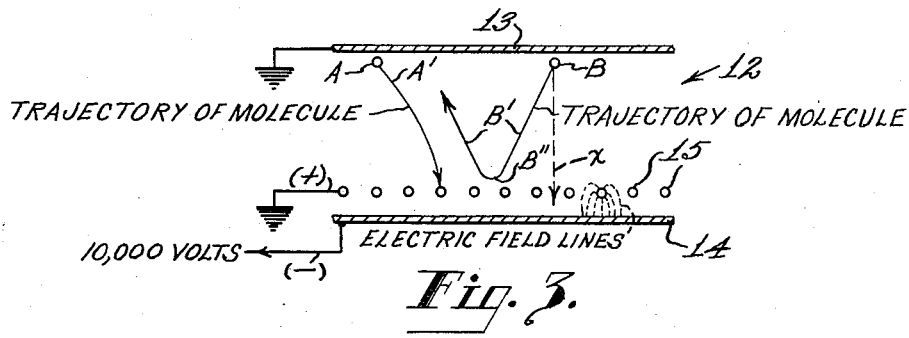
Figure 3 is a schematic view in longitudinal section through a waveguide cell embodying the present invention.

The gas-tight waveguide type cell or chamber 12 illustrated schematically in Figure 3 has a top plate or wall 13, a bottom plate or wall 14, and suitable side and end walls (not shown). The cell contains a gas at low pressure of the type herein above described. In the present instance it is assumed that the chosen microwave resonant gas is ammonia and that the $J=K=3$ inversion (see Figure 2) transition is considered.

The cell 12 contains a grid 15 comprising a plurality of fine parallel wires, preferably of tungsten, adjacent and parallel to the bottom plate 14. The plate 13 and grid 15 are at the same potential, which for convenience may be regarded as ground potential, while plate 14 is at the potential of, for example, minus 10,000 volts. The cell thus constructed is evacuated and filled with ammonia, for example, at a pressure of about $10^{-4}$ mm. of mercury such that the mean free molecular path is roughly comparable with the separation between the grid wires and the top plate 13 of the waveguide cell. As used herein, the term "roughly comparable" means from about one fifth to ten times.

Because of the potential difference between grid 15 and plate 14, there is a large electric field in the region encompassed between the two members and surrounding each grid wire. The spacing should be such that the field is at least 50,000 volts/cm.; higher field strengths such as 100,000—500,000 volts/cm., or more, give improved performance. An ammonia molecule B in the upper energy state moving in the trajectory B' shown in Figure 3 is moving first in a region where there is no or substantially no electric field strength, but then moves into the region of high field strength adjacent the grid 15 (portion B'' of the trajectory) or a region of high field strength between the grid 15 and plate 14 (not shown by trajectory B'). In a region of high field strength, because of the large electric field acting on the molecule, the energy levels are shifted as indicated in Figure 1. Thus, if molecule B approaches the grid, its internal energy is increased, whereas if a lower energy state molecule A approaches the grid, its internal energy is thereby decreased.

In molecule B, the increase in internal energy would represent a loss of kinetic energy. If molecule B were moving sufficiently slowly, or had a sufficiently small momentum in the direction X in Figure 3, it would be reflected out of the region of intense field back into the region between plate 13 and grid 15 of no or substantially no field strength, as indicated by trajectory B' in Figure 3. Note, in this connection, that the field strength falls off very rapidly in the direction from grid 15 toward upper wall 13. On the other hand, if a molecule is in the lower energy state (designated hereinabove as state 1), it is attracted into the region of high field strength and gains kinetic energy. It moves more rapidly, and it hits either the grid 15 or the plate 14. This is indicated in Figure 3 by molecule A moving along trajectory A'. An analysis shows that the most likely kind of trajectory to occur under conditions for which a momentum in the direction X is sufficiently small for an upper state molecule B to be reflected is one for which the molecule approaches the grid 15 with nearly glancing incidence as illustrated by the trajectory shown in Figure 4. Because of the glancing incidence, a molecule is more likely to hit grid 15 than plate 14. On the other hand, a molecule B approaching at a low angle of incidence is ordinarily reflected.

Figure 4:
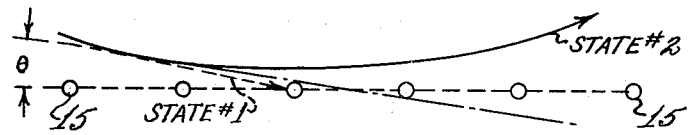
Figure 4 is a diagram used in describing the selective filter action of the grid structure employed in the cell of Figure 3.

It will thus be seen that the structure of the grid 15 and plate 14 produces an electric field which serves as a reflecting device for molecules in one particular energy state and an attracting device for those in the other energy state. The grid 15 attracts molecules in the lower energy state and repels molecules in the upper energy state, hence separating in effective fashion the molecules in one energy state from those in another energy state. Figure 4 also illustrates how the electric field serves to cause the molecules to be attracted toward the grid wires if in lower energy state 1 but to be repelled by said grid wires if in the higher energy state 2. As illustrated in Figure 4, this results in total reflection of molecules in state 2 which approach the grid at an incidence angle less than some maximum value $\theta$. $\theta$ is an angle which is a function of the nature of the molecule, the surface field strength at the grid wire, the grid wire spacing and grid wire diameter, and the kinetic energy of the molecule. On the other hand, for a grid wire spacing which is not too large, a molecule in state 1 with an incidence angle of $\theta$ or less always hits the grid, as illustrated in Figure 4. Consequently, the grid structure constitutes a selective filter which reflects some molecules in state 2 (those approaching at an incidence angle of $\theta$ or less), but none in state 1. By "reflect" is here meant that the molecule is repelled and does not hit a grid wire.

In Figure 3, grid 15 selectively reflects molecules in the upper energy state, and attracts molecules in the lower energy state in such a manner as to hit the grid 15 or plate 14. This, however, does not of itself result in a shift in populations of the aforementioned energy levels 1 and 2, as the device as so far described is still in thermal equilibrium—all temperatures being the same. However, if (in a manner hereinafter described) the temperature of the grid 15 is increased relative to that of wall 13, the population of molecules in state 2 is increased. From Equation 1 it is seen that the greater the temperature T, the more nearly equal $P_2$ and $P_1$ become. This means that the molecules originally in the lower energy state (1) hit heated grid 15 and are thrown into both states 1 and 2. On the other hand, the molecules originally in state 2 that are reflected back from the grid 15 remain in state 2. Thus there is a net transfer of population from state 1 to state 2.

It is advantageous, though not essential, also to heat plate 14. This permits state 1 molecules which pass through the grid and strike the plate also to be heated.

Improved performance will also result if the wall 13 (and in other embodiments the waveguide walls) be maintained at a temperature substantially lower than room temperature in order to increase the difference in temperature between the grid and cell walls.

There is a magnetic analog to the hereinabove described electrostatic state population translating method. In this atoms or molecules with a Zeeman shift of energy levels with magnetic field strength of the character illustrated in Figure 1 are used. The grid structure producing the region of high electrostatic field strength that acts as the "reflecting barrier" to molecules in the upper energy state 2 is replaced by a structure producing a high magnetic field. This provides an equivalent "reflecting barrier" for atoms or molecules with a suitable Zeeman effect. The mode of operation of this magnetic analog is otherwise identical with the hereinabove described electrostatic method.

Figure 5:
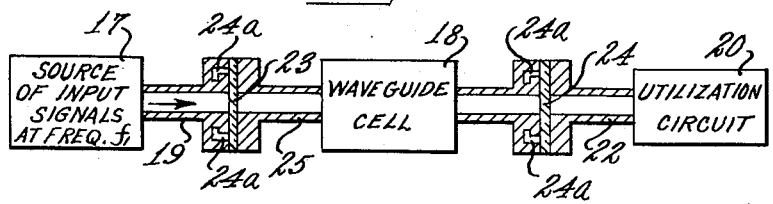
Figure 5 is a schematic diagram, partially in block form, of a molecular microwave amplifier according to the present invention.
Figure 6A:
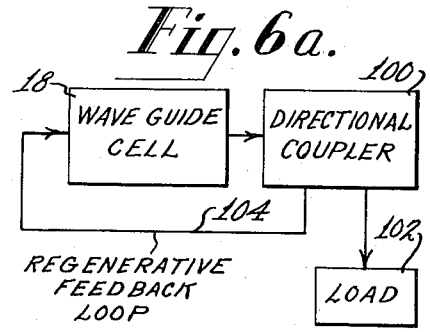
Figure 6a is a block circuit diagram of an oscillator employing the cell of Figure 6.

Referring to Figure 5, a source 17 of microwave signals which are to be amplified at frequency $f_1$ is directly coupled to the input end of a waveguide type cell 18 by a section of rectangular, hollowpipe wageguide 19. The structure of the cell 18 will be described later with particular reference to Figure 6. The output end of cell 18 is coupled to a utilization circuit 20 by a waveguide section 22. The waveguide cell 18 is made gas-tight by a pair of microwave permeable windows 23 and 24 formed of a material such as quartz or mica. One of said windows 23 is positioned at the input end of the cell 18 while the other window 24 is positioned at the output end of cell 18. The windows serve two purposes. One is to maintain the waveguide cell gas tight. The other is to insulate the side wall 28 and bottom wall 25 (see Figure 6) of the waveguide cell from the walls of waveguides 19 and 22. Choke flanges 24a which extend around the entire periphery of waveguides 22 and 19 maintain good electrical continuity (at frequency $f_1$) between the waveguide cell and waveguides 19 and 22.

Figure 5A:
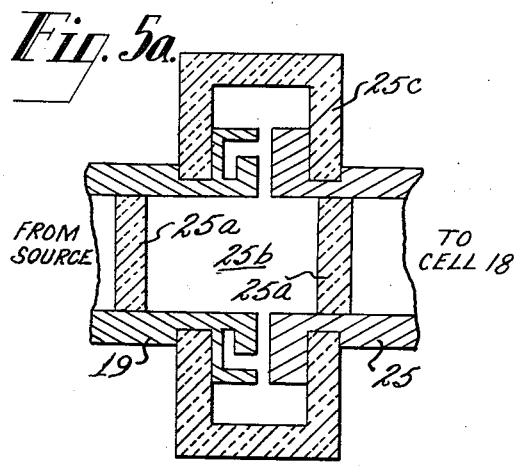
Figure 5a is a cross-sectional view of an insulated choke-joint which is usable in the arrangement of Figure 5.

In the arrangement of Figure 5, a bottom wall 25 of waveguide cell 18 is maintained at a potential of minus 10,000 volts with respect to ground (the potential of waveguides 19 and 22, for example). In some forms of the invention it may be advantageous to maintain waveguide wall 25 at a potential which is substantially more negative say on the order of minus 20,000 to 50,000 volts or more. In this form of the invention a somewhat different insulating arrangement than the one shown in Figure 5 would be required. One way of insulating for such high potentials is shown in Figure 5a. Two dielectric windows 25a close off the adjacent ends of waveguide 19 and the waveguide leading to cell 18. The space 25b between the dielectric windows is evacuated. A relatively long, peripheral dielectric member 25c extending around the choke flanges at the ends of the waveguide maintains the space 25b gas tight. An evacuating nozzle (not shown) communicates with space 25b.

Figure 6 illustrates a preferred embodiment of a waveguide cell which may be employed in the system of Figure 5. This cell comprises two electrically conductive plates 25 and 26 containing microwave chokes or traps 27, and two electrically conductive side plates 28, forming a rectangular hollow waveguide down which the microwave energy propagates. The plates 25 and 26 are insulated from the side plates 28 by strips or sheets 29 formed of any one of a number of dielectric materials such as polystyrene or polytetrafluoroethylene (the latter being sold commercially under the trade name "Teflon"). Plate 26 may be grounded and may be conductively connected to waveguides 19 and 22 (Figure 5). The cell 18 contains a grid 30 comprising a plurality of fine parallel wires, preferably of tungsten, tightly secured between the dielectric sheets 29 and the bottom edges or flanges of side plates 28. The grid is in good electrical contact with the bottom flanges of side plates 28 and may be welded or otherwise permanently mechanically and electrically connected to the flanges. A battery 32 connected between the side plates 28 provides a suitable grid heating potential such as 6 volts for heating the grid to a temperature of about 200°–300° C. or more. In this arrangement and the ones of the other figures an A. C. heating source may be used instead. As already mentioned, the side plates are insulated from waveguides 19 and 22 (Figure 5) by dielectric windows 23, 24. A suitable source of potential represented by battery 33 maintains the plate 25 at the potential of, for example, minus 10,000 volts. The structure shown in Figure 6 is part of a suitable sealed cell which (like the cell 18 of Figure 5) contains a gas such as ammonia. The structure shown in Figure 6 constitutes a waveguide structure in which the microwave travels in the $TE_{10}$ mode of the rectangular waveguide. As is known, a gas which normally absorbs energy at some definite frequency, such as the frequency $f_1$ referred to above in connection with Figure 4, is caused to amplify at that frequency by building up the intensity of the incident wave when the gas has been suitably prepared by putting it in a state of negative internal temperature. The cell of Figure 6, like that previously described in connection with Figures 1 to 4, continuously maintains the molecular gas in said cell in a state of negative internal temperature and therefore is continuously active for amplifying input energy in a system such as that of Figure 5.

By providing a suitable feedback path from the output waveguide section 22 in Figure 5 to the input waveguide section 19, an oscillator is obtained. An arrangement of this type is shown schematically in Figure 6a. Waveguide cell 18 may be similar to the one shown in Figure 6. The output of the waveguide cell is applied through a directional coupler 100 to a load 102. The directional coupler may consist of two lengths of waveguide having a common wall formed with one or more coupling apertures therein. One of the waveguides leads to load 102. The second of the waveguides leads to the regenerative feedback loop 104 which may also be a waveguide. The feedback loop 104 supplies a sufficient portion of the output of waveguide cell 18 to the input end thereof to maintain the waveguide cell oscillating.

An important consideration in the operation of the hereinabove described embodiments, and in the embodiments to be described hereinafter, is that the strong electrostatic field providing the "reflecting barrier" be localized in the vicinity of the grid structure producing said field. The frequency, such as the frequency $f_1$ referred to in connection with Figure 4, at which the cell 18 of Figure 4 amplifies (or oscillates) is the transition frequency of the molecular gas at the electric field strength seen by the molecules when they are emitting. Thus, unless the strong reflecting field is localized near the grid structure, the frequency of amplification will be shifted in a way depending on the detailed field distribution in the cell. However, this effect permit the frequency of amplification (or oscillation) to be shifted by the application of an appropriate approximately uniform electrostatic field to the region of the molecular gas. This is done in the embodiment of Figure 6 by means of battery 34 which maintains a constant potential between side plates 28 and plate 26, thereby setting up an electric field in the region between grid 30 and plate 26. The frequency can be altered by varying the potential supplied by battery 34. Thus, the arrangement of Figure 6 may be used as a modulator by connecting a source of modulating signal 106 in series with battery 34. This mode of operation is possible when the waveguide cell acts as an amplifier and also when it acts as an oscillator.

Tuning can also be accomplished with certain molecules, for example, ammonia, that possess a Zeeman effect as well as a Stark effect by applying a magnetic field to the entire waveguide cell 18 as shown schematically in Figure 6 by the dashed line H, by means of an external magnet. In this case, the frequency of amplification (or oscillation) is that of the molecular transition in a magnetic field of the strength supplied by the external magnet.

Figures 7 and 8 show a modified waveguide cell which may be used for a variety of purposes, for example, in the system of Figure 5, pursuant to the present invention. This cell comprises a section of rectangular hollow pipe waveguide containing a pair of dielectric slabs 35 and 36 each of which is in contact with one narrow side wall of the cell and extends along its longitudinal axis. These slabs 35 and 36 may be formed of a suitable ceramic material or one of the above-mentioned dielectrics such as "Teflon." The cell contains a grid 37 comprising a plurality of fine tungsten wires as previously described, which in this instance are held under tension by longitudinal metal bars or rails 38 dovetailed into the dielectric slabs 45 and 36. The cell also contains a metallic septum or plate 40 mounted in the slabs 35 and 36 beneath the grid 37 and extending parallel to said grid and to the broad waveguide walls 41 and 42. The low voltage battery 43 provides the grid heating potential, while a suitable source 44 maintains the plate 40 at a potential of, for example, minus 10,000 volts.

The operation of the device illustrated in Figures 7 and 8, as in the devices previously described, depends upon two key factors. First, because of the electric potential applied to the septum 40, there is a strong electric field at the surface of the grid wires. This electric field serves to cause the molecules to be attracted toward the grid wires if in state 1 (the lower energy state) but to be repelled by said grid wires if in the higher energy state 2, as illustrated in Figure 8. The second factor affecting the operation of the device concerns the effect of the temperature differential in the cell, as previously described. The effect of this temperature difference can further be illustrated by slightly simplifying the situation. Assume for purposes of illustration that both the septum 40 and grid 37 of Figures 7 and 8 are kept at an infinite temperature. Then the molecules in the space between the grid 37 and the top waveguide wall 41 can be divided into three classes, namely, (a) downward moving molecules, (b) reflected upward moving molecules, and (c) upward moving molecules that have hit either the grid 37 or septum 40 (this assuming a sufficiently long mean free path. Class (a) has a slight excess of molecules in state 1 over state 2. Class (c) has equal numbers in states 1 and 2. Class (b), however, is purely state 2 and causes a total excess in state 2 over that in state 1.

Although it can be shown that there is some improvement in performance when septum 40 is heated in addition to the grid 37, the heating of the grid is sufficient for successful operation. A temperature of 300° C. of the grid wires is sufficient for satisfactory operation of the device. In the case of a low noise amplifier, noise figures in the vicinity of 2 db or better are obtainable.

Figure 7A:
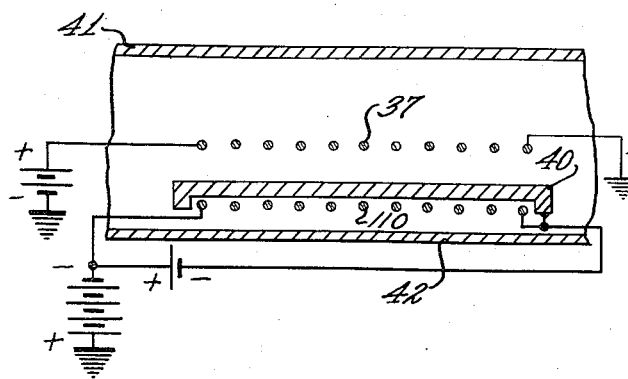
Figure 7a is a cross-sectional view of another modified waveguide cell, similar in some respects to the one of Figure 7.

Figure 7a illustrates an embodiment of the invention in which the septum 40 is heated. This embodiment is identical with the one shown in Figure 7 except that a heating coil 110 is located in the waveguide between septum 40 and wall 42. The heating coil is located in a depressed portion of the septum so as not to effect to any substantial extent the wave transmission properties of the cell.

An important advantage of the arrangements of Figures 7, 7a and 8 is that the cell walls may be maintained at the same potential as the walls of the waveguides leading from the source and to the load (waveguides 19 and 22 in the arrangement of Figure 5).

In the embodiments of the invention described in Figures 6, 7 and 7a, the gas cell is in the form of an elongated waveguide. Other forms of the invention may employ instead a cavity resonator for the waveguide gas cell. A cavity resonator type waveguide cell which acts as an amplifier is illustrated in Figure 9. This embodiment is similar to the one of Figure 6 except for members 120, 122 at opposite ends of the cell. As in the arrangement of Figure 6, the waveguide side walls (not shown in Figure 9), are insulated from one another and from the top and bottom walls 25, 26 of the cell. The cell is filled with a gas such as ammonia at low pressure. Members 120 and 122 are formed with peripheral chokes 124 of well known type. End member 120 is formed with a coupling aperture 126 and end member 122 is formed with a coupling aperture 128. Energy from source 17 at frequency $f_1$, the resonant frequency of the gas in the cell, passes through aperture 126, is amplified in the cavity resonator, and passes out of aperture 128 to a load such as utilization circuit 20 (Figure 5).

Figure 9A:
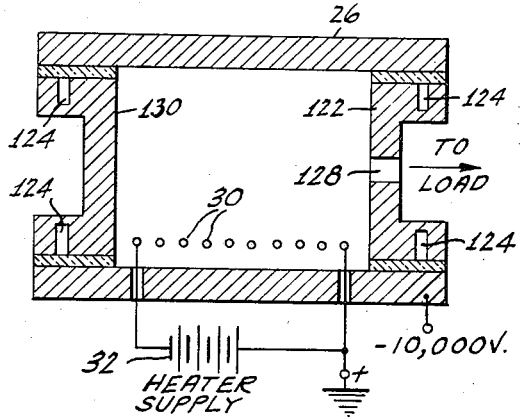

The embodiment of the invention shown in Figure 9a is identical with the one shown in Figure 9 except that member 130 (which is analogous annular member 120 of Figure 9) is not formed with a coupling aperture. The embodiment of Figure 9a is a gas cell which acts as a cavity resonator oscillator. In this embodiment, the oscillator requires no external feedback path, regenerative feedback occurring within the cavity resonator.

Figure 9B:
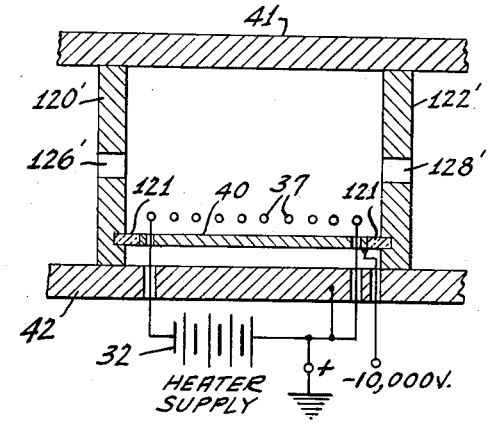

The embodiment shown in Figures 7 and 8 may also be used as either a cavity resonator oscillator or amplifier. Figure 9b illustrates its use as a cavity resonator amplifier. The structure is very similar to that of the cell shown in Figures 7 and 8, except for end walls 120', 122', one formed with coupling aperture 126' and the other with coupling aperture 128'. Unlike the embodiments of Figures 9 and 9a, the end walls need not be insulated from walls 41 and 42 of the cell. This is because the cell walls are at ground potential. However, plate 40, which is at a potential of minus 10,000 volts, must be insulated. This is accomplished by insulators 121 at opposite ends of plate 40 and set into grooves in plates 120' and 122'.

It will be apparent to those skilled in the art that a cavity resonator oscillator embodiment of the cell of Figures 7 and 8 may be built, preferably by eliminating the coupling aperture from one of the end walls. It is also clear that the embodiment shown in Figure 7a can also be converted to a cavity resonator type oscillator or amplifier by means similar to those explained in connection with the embodiment of Figure 9b.

Figure 10:
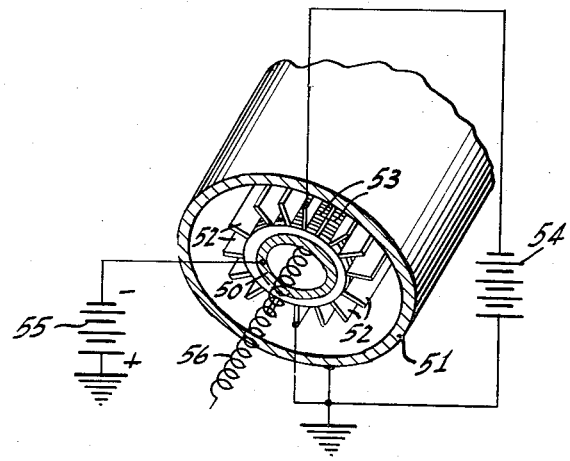
Figure 10 is a perspective view of a coaxial line type of cell embodying the invention.
Figure 11:
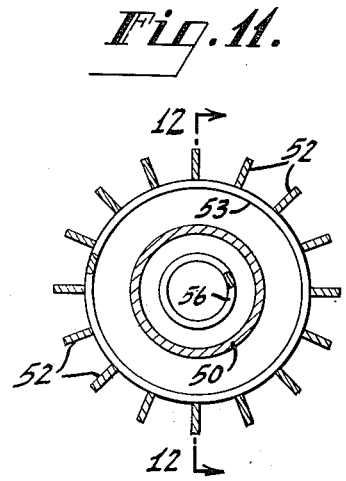
Figure 11 is a cross-section through the waveguide cell of Figure 10.
Figure 12:
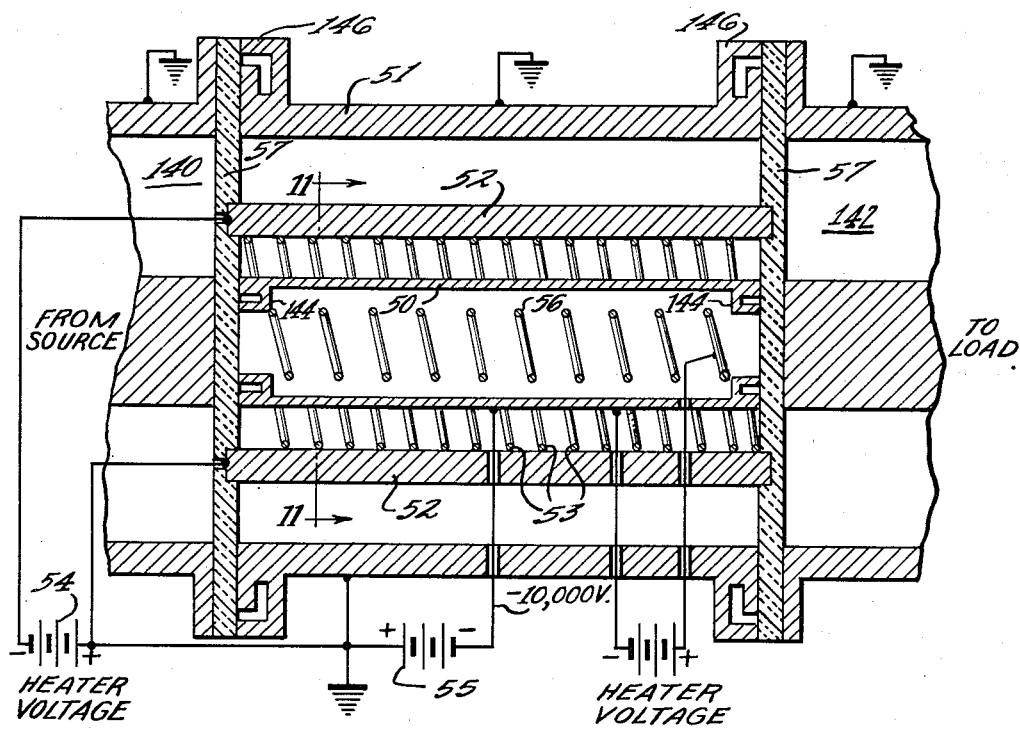
Figure 12 is a cross-section along line 12—12 of Figure 11.

Figures 10, 11 and 12 illustrate a modified form of the invention as applied to a coaxial line. The coaxial line comprises a hollow inner conductor 50, an outer conductor 51 and a series of electrically conductive ribs 52 arranged as longitudinally extending bars of a cylindrical cage coaxial with the inner conductor 50. A series of grid wires 53, which may be formed by one or more helical wires are connected to and supported by the inner sides of the ribs 52. A low voltage battery 54 is shown connected to two diametrically opposed ribs 52 for supplying heating current to the grid wires 53. Alternatively, each of the ribs 52 may be used for supplying heating current to the grid wires which are connected thereto. A suitable source of potential 55 maintains the inner conductor 50 at a potential with respect to the grid wires 53, such potential being, for example, minus 10,000 volts. Advantageously, the inner conductor 50 may be heated as well as the grid wires 53, a heating element 56 being shown disposed within the hollow conductor 50 for this purpose. The grid structure is supported at its ends by dielectric washers 57, so that it is coaxial with the central conductor as indicated in cross-section Figure 12, by being dovetailed into the washers 57.

As in the other embodiments, the coaxial line waveguide cell of Figures 10–12 is filled with a gas such as ammonia at low pressure. The cell may be coupled to a source such as 17 of Figure 5 by means of a length of coaxial line 140 and to a load such as utilization circuit 20 of Figure 5 by a second length of line 142.

The inner conductors of the coaxial lines 140 and 142 may be coupled to the inner conductor 50 of the coaxial line gas cell by choke joints 144 at the respective opposite ends of inner conductor 50. The outer conductors of coaxial lines 140 and 142 may be electrically coupled to the cell outer conductor by similar chokes 146 at opposite ends of the outer conductor of the coaxial line gas cell.

If desired, the coaxial line gas cell may be coupled to circular input and output waveguides rather than input and output coaxial lines. In such case matching transition sections of well known type would be employed between the circular waveguides and the coaxial line gas cell. For example, conical matching sections might be employed aligned at their base ends with the opposite ends of inner conductor 50 and with their pointed ends extending into waveguides 140 and 142.

The embodiment of Figures 10–12, like the others discussed previously, may also be modified to provide a cavity resonator type amplifier. All that is necessary is to provide conductive end walls formed with coupling apertures tuned to the resonant frequency of the gas.

In the explanation of the various hereinabove-mentioned embodiments of the invention, the grid structure has been specified to be at positive potential with respect to the second electrode that produces the intense field adjacent the grid. This was so chosen to minimize electron emission from the grid. Electron emission is undesirable primarily because of the danger of a vacuum discharge developing between the grid and second electrode leading to physical damage or destruction of the structure. If this danger is removed by suitable choice of electrode and grid materials, geometry and applied potential, the polarity of the potential developing the intense field is not as important.

There are a fairly large group of gases which have the characteristics described in the foregoing pages. Those responsive to electrostatic fields include ammonia (including deuterated ammonia); the methyl halides; the cyanogen halides and HCN; HDS (partially deuterated hydrogen sulphide); ICl; FCl; and HCl. Those responsive to magnetic fields include the alkali metal vapors (Na, K, Cs, Rb, Li, and atomic hydrogen).

In the claims which follow, the term "substantially zero" electric, or electrostatic, or magnetic field is used. This is a relative term. Thus, the actual field (electrostatic, for example) may be zero volts per centimeter or may be up to several hundred volts per centimeter. However, compared to the intense field at the heating electrode of 50,000 volts per centimeter and more, any field up to several hundred volts per centimeter may properly be termed "substantially zero" field.

Whether the field is zero, or substantially zero, it is important that it be substantially uniform if a single output frequency is desired.

What is claimed is:

1. Apparatus for maintaining a microwave resonant gas in a condition such that of the molecules in the two energy states related to the microwave resonance, more are in the higher energy state than in the lower energy state, comprising means for confining the gas at reduced pressure in a region of substantially no electric field; and means for applying heat to the gas in a region of an intense electric field.

2. Apparatus according to claim 1, further including means for applying microwave energy to said gas at a frequency related to the microwave resonance frequency of said gas, and means for deriving from said gas microwave energy of greater magnitude than said applied energy.

3. Apparatus for utilizing a microwave resonant substance to derive microwave amplification therefrom for microwaves traveling along a predetermined path, comprising means for confining said substance in a gaseous state in the path of travel of the microwaves to be amplified, a heated electrode within said confining means and in contact with said confined gaseous material, and means maintaining an electrostatic field in a region adjacent to said heated electrode.

4. Translating apparatus for continuously maintaining a microwave resonant gaseous substance of the type two of whose energy levels are such that the internal energy of the gaseous substance when in an upper of said levels increases in a region of intense electrostatic field whereas the internal energy of the substance in a lower of said levels decreases in a region of intense electrostatic field in a condition wherein the molecular population of two energy states related to a microwave resonance consists predominantly of molecules in the higher of the energy states, in which condition said substance emits energy at a resonant frequency thereof, said apparatus comprising means defining a chamber adapted to have said substance disposed therein, a first electrode disposed in said chamber for contact with said substance, a second electrode spaced from said first electrode, circuit means connected to maintain an electrostatic field between said first and second electrodes for separating molecules of said higher energy state from molecules of the lower of said two energy states, and means for heating at least one of said electrodes for producing a supply of molecules of populations in both of said energy states.

5. Apparatus according to claim 4, wherein said one electrode comprises a series of grid wires.

6. Apparatus according to claim 5, wherein said means for heating said one electrode comprises circuit means connected to said grid wires for passing a heating current therethrough.

7. Apparatus according to claim 4, in which said chamber comprises a length of waveguide pipe of rectangular transverse cross-sectional configuration.

8. Apparatus according to claim 7, wherein said second electrode extends parallel to and adjacent to one of the wider walls of said rectangular waveguide, and said first electrode is disposed intermediate and extending parallel to said second electrode and the other of said wider walls.

9. Apparatus according to claim 8, in which said first electrode comprises a series of grid wires and wherein said means for heating said first electrode comprises circuit means connected to said grid wires for passing heating current therethrough.

10. Apparatus according to claim 8, further comprising dielectric loading means for producing free space loading characteristics in the guide extending along said narrower walls, said first and second electrode means being supported by said loading means.

11. Apparatus according to claim 4, wherein said chamber is defined in part by an electrically conductive plate which forms said second electrode and further defined in part by two electrically conductive side plates electrically insulated from each other, said first electrode comprising a series of grid wires which extend between said side plates in proximity to said plate comprising said second electrode and in which said means for heating said first electrode comprises circuit means for energizing said two side plates to cause heating current to flow through said grid wires.

12. Apparatus according to claim 11, wherein said plate has microwave chokes disposed along opposite edges thereof.

13. Apparatus according to claim 4, wherein said chamber is defined by the outer conductor of a coaxial line, the inner conductor thereof constituting said second electrode, said first electrode comprising a series of grid wires extending along and surrounding said inner conductor.

14. Apparatus according to claim 13, wherein said inner conductor is hollow, said apparatus further comprising heating means disposed in said inner conductor for heating the same.

15. Apparatus according to claim 4, further comprising microwave transmission means communicating with said chamber.

16. Apparatus according to claim 4, further comprising microwave input and output means communicating with said chamber for transmitting microwaves therethrough whereby said apparatus modifies microwave energy passing from said input means to said output means.

17. Apparatus according to claim 4, in which said chamber is defined by electrically conductive walls constituting a cavity resonator, said walls having at least one coupling iris included therein for the passage of microwave energy therethrough.

18. Apparatus according to claim 4, including means for applying a second field for adjusting the frequency of said microwave resonance.

19. Apparatus according to claim 18 wherein said second field is a Stark field.

20. Apparatus according to claim 19, wherein said Stark field is applied between said first electrode and a wall of said chamber most remote from said second electrode.

21. Apparatus according to claim 4 including means for applying a Zeeman field to said substance for adjusting the frequency of said microwave resonance.

22. Amplifying apparatus of the molecular type for amplifying microwaves traveling along a defined path, comprising means defining a gas-tight chamber disposed in the path of travel of the microwaves to be amplified, a microwave resonant substance in a gaseous state disposed in said chamber, said substance being of the type two of whose energy levels are such that the internal energy of the substance when in an upper of said levels increases in a region of intense electrostatic field, and the internal energy of the substance in a lower of said levels decreases in a region of intense electrostatic field, a first electrode disposed in said chamber in contact with said substance, means for heating said first electrode, and a second electrode spaced from said first electrode for maintaining an electrostatic field in a region adjacent to said first electrode.

23. Amplifying apparatus of the molecular type for amplifying microwaves traveling along a defined path, comprising an elongated gas-tight chamber having opposed microwave transparent end walls which are disposed in said path, a microwave resonant substance in a gaseous state confined with said chamber, said substance being of the type two of whose energy levels are such that the internal energy of the substance when in an upper of said levels increases in a region of intense electrostatic field, and the internal energy of the substance in a lower of said levels decreases in a region of intense electrostatic field, a grid member extending longitudinally of said chamber in contact with said gaseous material, said grid member comprising a series of parallel grid wires extending transversely of said path, an energizing circuit coupled to said grid member for heating said member, an electrode spaced from said grid member and extending parallel to said path, and means for energizing said electrode from a source of potential to maintain an electrostatic field in a region adjacent to said grid member.

24. Apparatus according to claim 23, wherein said chamber is a cavity resonator, said resonator including microwave coupling irises serving as the input and output means thereof.

25. In combination, a closed container, one region of which is at a relatively low temperature and in substantially zero field of a given type; a gas at reduced pressure in said container of the type two of whose energy levels are such that the internal energy of the gas when in an upper of said levels increases in a region of intense field of said given type, whereas the internal energy of the gas in a lower of said levels decreases in a region of intense field of said given type; heating means in another region of said container; and means operatively associated with said heating means for applying a restricted, intense field of said given type adjacent to said heating means.

26. In combination, a closed container, one region of which is at a relatively low temperature and in substantially zero electrostatic field; a gas at reduced pressure in said container of the type two of whose energy levels are such that the internal energy of the gas when in an upper of said levels increases in a region of intense electrostatic field, whereas the internal energy of the gas in a lower of said levels decreases in a region of intense electrostatic field; heating means in another region of said container; and means operatively associated with said heating means for applying a restricted, intense electrostatic field adjacent to said heating means.

27. In combination, a closed container, one region of which is at a relatively low temperature and in substantially zero magnetic field; a gas at reduced pressure in said container of the type two of whose energy levels are such that the internal energy of the gas when in an upper of said levels increases in a region of intense magnetic field, whereas the internal energy of the gas in a lower of said levels decreases in a region of intense magnetic field; heating means in another region of said container; and means operatively associated with said heating means for applying a restricted, intense magnetic field adjacent to said heating means.

28. In combination, a closed container, one region of which is at a relatively low temperature and in substantially zero electrostatic field; a gas at reduced pressure in said container of the type two of whose energy levels are such that the internal energy of the gas when in an upper of said levels increases in a region of intense electrostatic field, whereas the internal energy of the gas in a lower of said levels decreases in a region of intense electrostatic field; a grid shaped heating element in another region of said container; and means operatively associated with said heating element for applying a restricted, intense, direct electrostatic field adjacent to said heating element.

29. In combination, a closed container, one region of which is at a relatively low temperature and in substantially zero electrostatic field; a gas at reduced pressure in said container of the type two of whose energy levels are such that the internal energy of the gas when in an upper of said levels increases in a region of intense electrostatic field, whereas the internal energy of the gas in a lower of said levels decreases in a region of intense electrostatic field; a grid shaped heating element in another region of said container; conductive means adjacent to said heating element and located on a side thereof opposite that of said one region of said container; and means coupled between said heating element and said conductive means for applying a direct voltage across said two elements of sufficient magnitude to provide an intense, restricted, electrostatic field adjacent to said heating element.

30. In the combination as set forth in claim 29, said heating element comprising a plurality of substantially parallel wires lying in a plane.

31. In the combination as set forth in claim 29, said heating element being flat, and said conductive means being arranged adjacent and parallel to said heating element.

32. In the combination as set forth in claim 31, said conductive means comprising a portion of the wall of said container and being insulated from the remainder of the wall of said container.

33. In combination, a closed container of rectangular cross-section, one region of which is at relatively low temperature and subsequently zero electrostatic field; a gas at reduced pressure in said container of the type two of whose energy levels are such that the internal energy of the gas when in an upper of said levels increases in a region of intense electrostatic field, whereas the internal energy of the gas in the lower of said levels decreases in a region of intense electrostatic field; a flat, grid shaped heating element arranged parallel to one of said walls in another region of said container; flat conductive means arranged closely adjacent and parallel to said heating element and located on a side thereof opposite that of said one region of said container; and means coupled between said heating element and said conductive means for applying direct voltage across said two elements of sufficient magnitude to provide an intense, restricted, electrostatic field adjacent to said heating element.

34. In the combination as set forth in claim 33, said one wall comprising said flat conductive means, said one wall being insulated from the remaining walls of said container.

35. In combination, a closed container, four walls of which form a rectangular cross-section of said container, one of said walls being insulated from the remaining three walls, and one region of said container being at a relatively low temperature and substantially zero electrostatic field; a gas at reduced pressure in said container of the type two of whose energy levels are such that the internal energy of the gas when in an upper of said levels increases in a region of intense electrostatic field, whereas the internal energy of the gas in the lower of said levels decreases in a region of intense electrostatic field; a flat, grid shaped heating element arranged parallel to said one wall; and means coupled between said heating element and said one wall for applying direct voltage across said one wall and said heating element of sufficient magnitude to provide an intense, restricted, electrostatic field adjacent to said heating element and of a sense such that the heating element is a positive potential relative to said one wall.

36. In combination, a closed container, four walls of which form a rectangular cross-section of said container, said four walls being insulated from one another, and one region of said container being at a relatively low temperature and substantially zero electrostatic field; a gas at reduced pressure in said container of the type two of whose energy levels are such that the internal energy of the gas when in an upper of said levels increases in a region of intense electrostatic field, whereas the internal energy of the gas in the lower of said levels decreases in a region of intense electrostatic field; a flat, grid shaped heating element arranged parallel to one of said walls; means coupled between said heating element and said one wall for applying direct voltage across said one wall and said heating element of sufficient magnitude to provide an intense, restricted, electrostatic field adjacent to said heating element; and means for applying a difference in potential between a wall of said container opposite said one wall and said heating element.

37. In combination, a closed container, four walls of which form a rectangular cross-section of said container, said four walls being insulated from one another, and one region of said container being at a relatively low temperature and substantially zero electrostatic field; a gas at reduced pressure in said container of the type two of whose energy levels are such that the internal energy of the gas when in an upper of said levels increases in a region of intense electrostatic field, whereas the internal energy of the gas in the lower of said levels decreases in a region of intense electrostatic field; a flat, grid shaped heating element arranged parallel to one of said walls; means coupled between said heating element and said one wall for applying direct voltage across said one wall and said heating element of sufficient magnitude to provide an intense, restricted, electrostatic field adjacent to said heating element; and means for applying a direct potential difference between the one of said four walls opposite said one wall and said heating element.

38. In combination, a closed container, four walls of which form a rectangular cross-section of said container, said four walls being insulated from one another, and one region of said container being at a relatively low temperature and substantially zero electrostatic field; a gas at reduced pressure in said container of the type two of whose energy levels are such that the internal energy of the gas when in an upper of said levels increases in a region of intense electrostatic field, whereas the internal energy of the gas in the lower of said levels decreases in a region of intense electrostatic field; a flat, grid shaped heating element arranged parallel to one of said walls; means coupled between said heating element and said one wall for applying direct voltage across said one wall and said heating element of sufficient magnitude to provide an intense, restricted, electrostatic field adjacent to said heating element; and means for applying a modulating signal across the one of the four walls of said container opposite said one wall and said heating element.

39. In combination, a closed container, one region of which is at a relatively low temperature and in substantially zero field of a given type; a microwave resonant gas at reduced pressure in said container of the type two of whose energy levels are such that the internal energy of the gas when in an upper of said levels increases in a region of intense field of said given type, whereas the internal energy of the gas in a lower of said levels decreases in a region of intense field of said given type; heating means in another region of said container; means operatively associated with said heating means for applying a restricted, intense field of said given type adjacent to said heating means; and means for passing electromagnetic waves at the frequency to which said gas is resonant through said container.

40. In the combination as set forth in claim 39, said closed container comprising a section of waveguide with microwave permeable windows at opposite ends thereof.

41. In combination, a closed container, one region of which is at a relatively low temperature and in substantially zero electrostatic field; a gas which is microwave resonant at a given frequency and at reduced pressure located in said container of the type two of whose energy levels of such that the internal energy of the gas when in an upper of said levels increases in a region of intense electrostatic field, whereas the internal energy of the gas in a lower of said levels decreases in a region of intense electrostatic field; heating means in another region of said container; means operatively associated with said heating means for applying a restricted, intense electrostatic field adjacent to said heating means; and means for passing an electromagnetic wave through said container at the frequency of resonance of said gas.

42. In the combination as set forth in claim 41, said closed container comprising a cavity resonator.

43. In the combination as set forth in claim 41, said closed container comprising a section of waveguide which includes means at opposite ends thereof for supplying electromagnetic energy thereto and removing electromagnetic energy therefrom.

44. In combination, a closed container, one region of which is at a relatively low temperature and in substantially zero field of a given type; a gas in said container at a pressure such that the mean free path of the gas is roughly comparable to the dimensions of the container; heating means in another region of said container; and means operatively associated with said heating means for applying a restricted, intense field of said given type adjacent to said heating means.

45. In combination, a closed container, one region of which is at a relatively low temperature and substantially zero field of a given type; heating means in another region of said container; a gas in said container at a pressure such that the mean free path of the gas is between approximately one fifth and ten times the spacing between said heating means and the furthest wall of said container; and means operatively associated with said heating means for applying a restricted, intense field of said given type adjacent to said heating means.

46. In combination, a closed container, one region of which is at a relatively low temperature and substantially zero electrostatic field; a gas in said container at a pressure such that the mean free path of the gas is roughly comparable to the dimensions of the container; heating means in another region of said container; and means operatively associated with said heating means for applying a restricted, intense electrostatic field adjacent to said heating means.

47. In combination, a closed container, one region of which is at a relatively low temperature and substantially zero electrostatic field; heating means in another region of said container; a gas in said container at a pressure such that the mean free path of the gas is between approximately one fifth and ten times the spacing between said heating means and the furthest wall of said container; and means operatively associated with said heating means for applying a restricted, intense electrostatic field adjacent to said heating means.

48. In combination, a closed container, one region of which is at a relatively low temperature and substantially zero electrostatic field; heating means in another region of said container; a microwave resonant gas in said container at a pressure such that the mean free path of the gas is between approximately one fifth and ten times the spacing between said heating means and furthest wall of said container; and means operatively associated with said heating means for applying a restricted, intense electrostatic field adjacent to said heating means.

49. In combination, a closed container, one region of which is at a relatively low temperature and substantially zero electrostatic field; heating means in another region of said container; ammonia gas in said container at a pressure such that the mean free path of the gas is between approximately one fifth and ten times the spacing between said heating and furthest wall of said container; and means operatively associated with said heating means for applying a restricted, intense electrostatic field adjacent to said heating means.

50. An amplifier comprising, in combination, a tubular transmission means closed to the atmosphere, one region of which is at a relatively low temperature and substantially zero electrostatic field; heating means in said tubular means spaced from the region thereof of relatively low temperature; a microwave resonant gas in said tubular means at a pressure such that the mean free path of the gas is between approximately one fifth and ten times the spacing between said heating means and said region of relatively low temperature; means operatively associated with said heating means for applying a restricted, intense electrostatic field adjacent to said heating means; said tubular means being formed with electromagnetic wave coupling means at opposite end portions thereof; and means coupled to one of said coupling means for applying an electromagnetic wave at the frequency of resonance of said microwave resonant gas to said tubular means.

51. Amplifying apparatus of the molecular type for amplifying microwaves traveling along a defined path, comprising an elongated section of waveguide pipe of rectangular transverse cross-section disposed in alignment with said path, microwave-transparent closure members disposed at opposite ends of said pipe section and defining therewith a gas-tight chamber, a microwave-resonant gas confined within said chamber, said gas being of the type two of whose energy levels are such that the internal energy of the gas when in an upper of said levels increases in a region of intense electrostatic field, whereas the internal energy of the gas in a lower of said levels decreases in a region of intense electrostatic field; a grid member comprising spaced parallel side members and a series of parallel grid wires extending therebetween, said grid member extending parallel to opposite walls of said pipe section; an electrode member extending parallel to said grid member intermediate said grid member and one of said walls; heating means for maintaining said grid member at a temperature higher than that of said walls, and circuit means connected with said electrode member for maintaining a constant electrostatic field in a region adjacent to said grid member.

52. Apparatus according to claim 51, further comprising a pair of longitudinally grooved insulating members extending longitudinally of said pipe section along opposite walls thereof which are normal to said grid member, said side members and edge portions of said grid member and electrode member being received in said grooves.

53. Apparatus according to claim 51, in which the side walls parallel to said grid member are wider than the side walls along which said insulating members extend.

54. In combination, a tubular electromagnetic wave transmission means closed to the atmosphere, one region of which is at relatively low temperature and substantially zero electrostatic field, and including electromagnetic wave coupling means at at least one end portion thereof; heating means in said tubular means spaced from the region thereof of relatively low temperature; a microwave resonant gas in said tubular means of a type two of whose energy levels are such that the internal energy of the gas when in an upper of said levels increases in a region of intense electrostatic field, whereas the internal energy of the gas in a lower of said levels decreases in a region of intense electrostatic field and at a pressure such that the mean free path of the gas is between approximately one fifth and ten times the spacing between said heating means and said region of relatively low temperature; and a high voltage electrode positioned adjacent said heating means for applying a restricted, intense electrostatic field adjacent to said heating means of a polarity such that electron emission from said heating means is minimized.

55. In the combination as set forth in claim 54, said high voltage electrode being centrally located in said transmission means, and said heating means comprising a grid concentric with said electrode.

56. In combination, a hollow, cylindrical electromagnetic wave transmission means closed to the atmosphere, one region of which is at a relatively low temperature and substantially zero electrostatic field, and including electromagnetic wave coupling means at at least one end portion thereof; a hollow, cylindrical, parallel-wire grid heating means concentrically arranged within said cylindrical wave transmission means and spaced from the region thereof of relatively low temperature; a microwave resonant gas in said cylindrical wave transmission means of the type two of whose energy levels are such that the internal energy of the gas when in an upper of said levels increases in a region of intense electrostatic field, whereas the internal energy of the gas in a lower of said levels decreases in a region of intense electrostatic field and at a pressure such that the mean free path of the gas is between approximately one fifth and ten times the spacing between said heating means and said region of relatively low temperature; a high voltage electrode centrally located within said hollow grid heating means; and means for applying a potential difference between said heating means and said electrode of a magnitude sufficient to produce a restricted, intense electrostatic field adjacent to said heating means.

57. In the combination as set forth in claim 56, said high voltage electrode being in the form of a hollow cylinder, and further including a heating coil within the hollow of said high voltage electrode for heating said high voltage electrode.

58. In combination, a cavity resonator closed to the atmosphere, one region of which is at relatively low temperature and substantially zero electrostatic field, and including electromagnetic wave coupling means at at least one end portion thereof; heating means in said cavity resonator spaced from the region thereof of relatively low temperature; a microwave resonant gas in said cavity resonator of the type two of whose energy levels are such that the internal energy of the gas when in an upper of said levels increases in a region of intense electrostatic field, whereas the internal energy of the gas in a lower of said levels decreases in a region of intense electrostatic field and at a pressure such that the mean free path of the gas is between approximately one fifth and ten times the spacing between said heating means and said region of relatively low temperature; and a high voltage electrode positioned adjacent said heating means for applying a restricted, intense electrostatic field adjacent to said heating means of a polarity such that electron emission from said heating means is minimized.

59. In combination, a closed container, one region of which is at a relatively low temperature and in substantially zero electric field; a gas at reduced pressure in said container of the type two of whose energy levels are such that the internal energy of the gas when in an upper of said levels increases in a region of intense electric field; whereas the internal energy of the gas in a lower of said levels decreases in a region of intense electric field; and means in another region of said container for reflecting the molecules of gas in the upper of said states which approach said means back into the region of substantially zero field without affecting the energy state of said molecules, and for converting a portion of the molecules of gas in the lower of said states which approach said means to molecules in the upper of said states and returning the converted molecules to said region of substantially zero field.

60. An oscillator comprising, in combination, a tubular transmission means closed to the atmosphere, one region of which is at relatively low temperature and substantially zero electrostatic field; heating means in said tubular means spaced from the region thereof of relatively low temperature; a microwave resonant gas in said tubular means of the type two of whose energy levels are such that the internal energy of the gas when in an upper of said levels increases in a region of intense electrostatic field, whereas the internal energy of the gas in a lower of said levels decreases in a region of intense electrostatic field and at a pressure such that the mean free path of the gas is between approximately one fifth and ten times the spacing between said heating means and said region of relatively low temperature; a high voltage electrode positioned adjacent said heating means for applying a restricted, intense electrostatic field adjacent to said heating means of a polarity such that electron emission from said heating means is substantially prevented; said tubular means being formed with electromagnetic wave coupling means at opposite end portions thereof; and regenerative feedback means coupled between said two coupling means.

61. An oscillator as set forth in claim 60, said tubular transmission means comprising a cavity resonator.

62. An oscillator as set forth in claim 61, said feedback means being within said tubular means.

63. An oscillator as set forth in claim 60, said feedback means being external of said tubular means.

References Cited in the file of this patent

UNITED STATES PATENTS

| | | |
|---|---|---|
| 2,265,796 | Boersch | Dec. 9, 1941 |
| 2,707,231 | Townes | Apr. 26, 1955 |